Oct. 20, 1936.  J. T. SPRINGER  2,057,797
REPAIR PATCH FOR TIRE CASINGS
Filed May 25, 1931  2 Sheets-Sheet 1
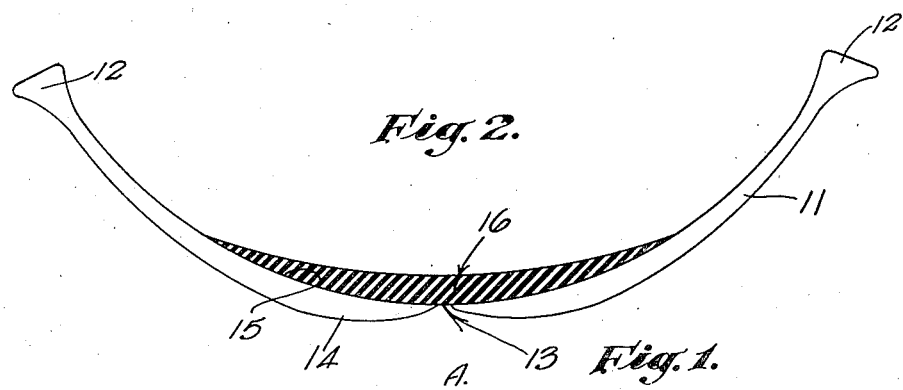
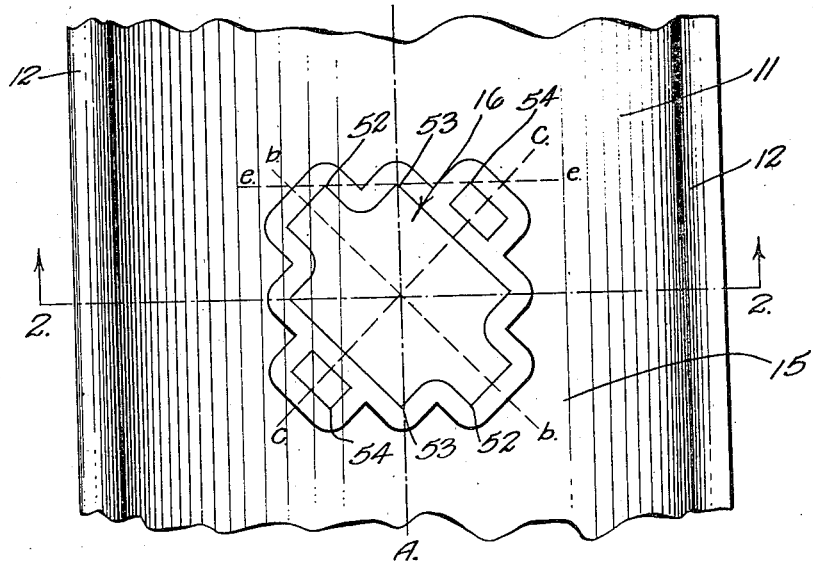
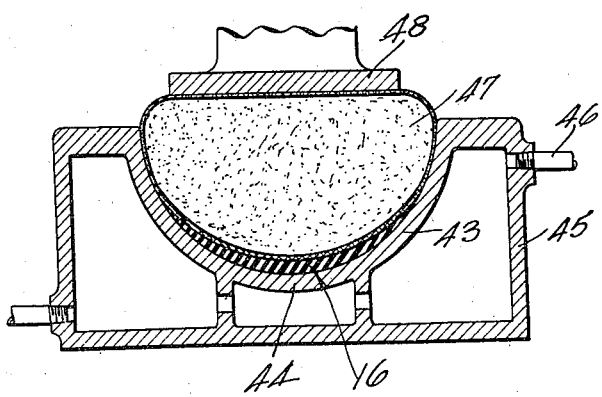
INVENTOR
JOHN T. SPRINGER,
BY
Fad W Lavin
ATTORNEY.

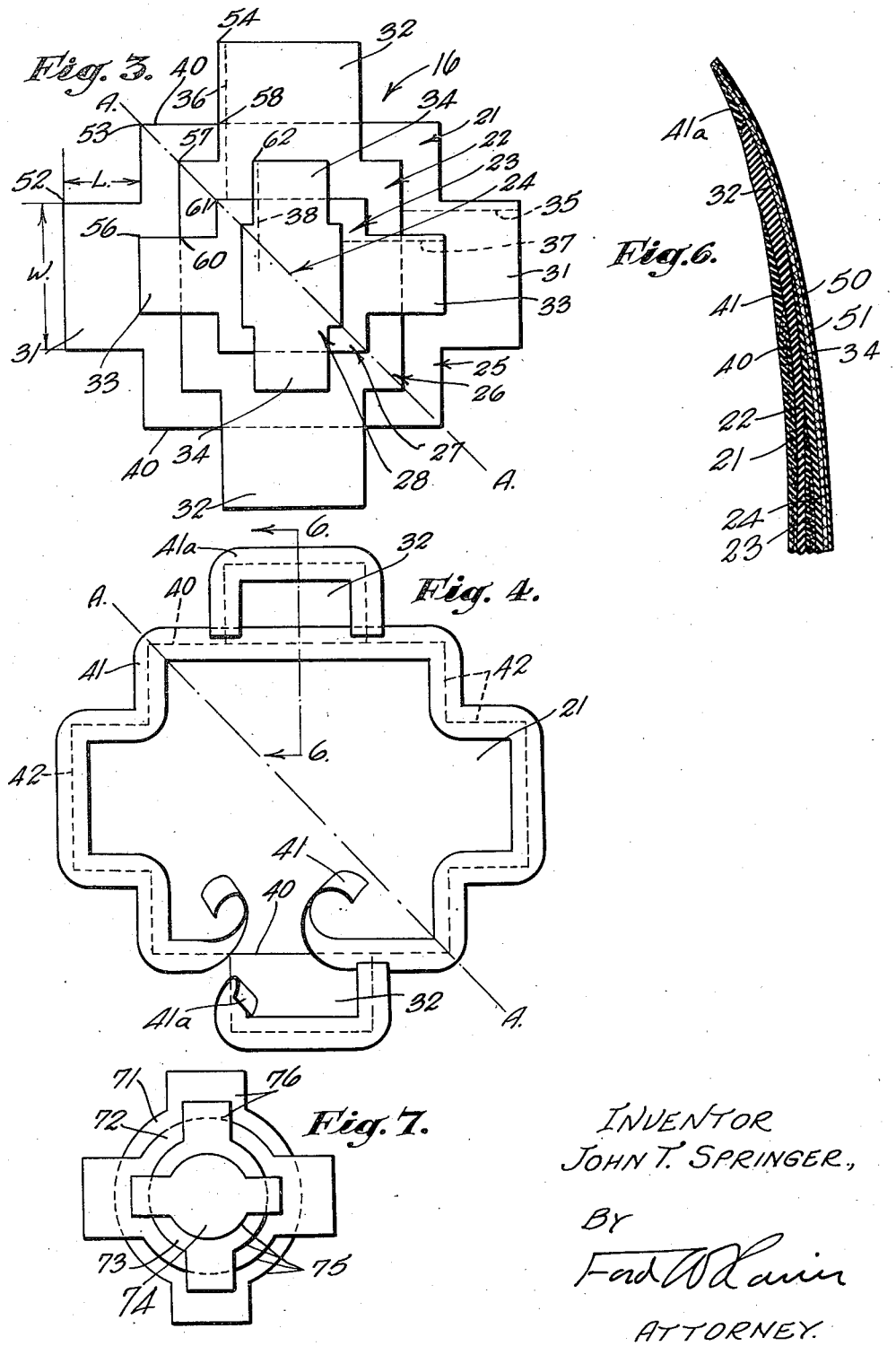

Patented Oct. 20, 1936

2,057,797

UNITED STATES PATENT OFFICE 2,057,797

REPAIR PATCH FOR TIRE CASINGS

John T. Springer, Los Angeles, Calif., assignor, by decree of court, to Sherry Springer, widow of said John T. Springer, deceased Application May 25, 1931, Serial No. 539,732

38 Claims. (Cl. 152—26)

My invention relates to a simple means for patching or reinforcing a tire casing, and has for its principal object to provide such a means or patch having maximum flexibility, durability, and strength so that when employed to patch or reinforce a tire casing, such patch portion will be substantially as strong as the original casing and of such durability that it will withstand continual flexing and severe usage at least as long as the structure of the repaired tire casing with which it is employed.

It is an object of the invention to provide a means of the above character consisting of layers or plies of reinforced rubber material, such as cord tire fabric, so formed and combined that condensation of strains at any point in the repair or patch means is avoided, and it is a further object to provide a means of this character in which the resistance to flexure increases from minimum to maximum as the line of flexure travels toward the center of the member from an edge thereof, and decreases from maximum to minimum as the line of flexure moves from the center of the member to the edge thereof.

A further object of the invention is to provide a patch of the above character consisting of separate plies of cord fabric assembled in a superimposed position, these individual plies having a novel form whereby the alternate plies will be tied together when in a patch.

It is a further object of the invention to provide a patch member of the above character in which the edges of the plies are protected and sealed in such a manner that the plies will not break along the lines of overlap.

A further object of the invention is to provide a patch of the above character consisting of overlying plies of cord-reinforced rubber, each ply or layer having a central portion or area with diametral tabs extending therefrom, each of the succeeding plies or layers being of smaller size than the preceding ply or layer and being turned alternately so that the tabs thereof will project at right angles.

It is a further object of the invention to provide in a repair patch of the character described in the preceding paragraph a proportioning of the central portions and tabs in such a manner that the second consecutive plies or layers will be tied together by the extension of the tabs over the intervening layers, and in which the overlapping of the plies is accomplished without building up of a shoulder sufficient to cause a concentration of flexure and consequent breakage due to the concentration of flexure.

A further object of the invention is to provide a patch of the above character which is flexible and has cord reinforcing therein positioned so that when the patch is employed in a tire, the cord reinforcing of the patch will flex in the same manner as the cord reinforcing of the tire, and it is a further object to provide an improved construction by which it is possible to obtain a reinforced tire patch built up of consecutive layers of sheet rubber material, which patch is partly cured in curved form to fit the interior contour of the tire and has a substantially smooth inner face which will not chafe or injure the inner tube employed in the tire.

The ply material from which patches are ordinarily made is a fabric material which has been impregnated with rubber. This fabric material has some thickness and is ordinarily cut to size, and the edge walls extend at right angles to the surface of the material. There will therefore be a shoulder at the edge of the ply members which prevents the patch from having an even contour, which is highly undesirable. In my invention I attach to the edge portion of one or all of the ply members a sealing strip which is preferably formed from a rubber or rubber composition. This sealing strip is preferably laid so as to overlap the edge and so that a portion thereof extends outwardly from the edge. The extending portion of the sealing strip is tapered to a thin edge. In this manner a sharp shoulder is avoided, and a patch having a smooth contour may be provided. Such a construction is highly desirable because it will prevent therein sharp edges which will prevent close adherence to the casing which is being repaired, and will avoid injuring the inner tube which is thereafter placed in the casing for use on a vehicle.

In the preferred form of my invention I vulcanize the sealing strip to the patch structure which may be composed of one or more ply members or sheets of cord material. The tapering of the sealing member is preferably accomplished by placing the patch with the sealing strip on the edge thereof in a suitable mold so that the same may be vulcanized under pressure. The sealing strip, under the action of the heat and under suitable pressure applied thereto, will thin out into a feather edge and will eliminate the shoulder provided by the edge of the ply member.

It is accordingly an object of my invention to provide a patch structure comprised of one or more plies having a sealing member applied to the edge thereof, which sealing member has an extending portion which is tapered to a thin edge.

Further objects and advantages of the invention will be made evident throughout the following part of the specification.

Referring to the drawings, which are for illustrative purposes only,

Fig. 1 is a view showing a portion of the interior of a tire casing having a preferred embodiment of my invention therein, the rim-engaging beads of the tire casing being spread apart from their normal position so as to flatten the wall of the casing.

Fig. 2 is an enlarged cross section on a plane represented by the line 2—2 of Fig. 1.

Fig. 3 is a view of an assembly of reinforced sheet rubber ply members in the relative positions occupied by them in the simple form of tire patch disclosed in Figs. 1 and 2, this figure being a view of the back of the patch.

Fig. 4 is a front view of the patch assembly shown in Fig. 3, this view showing the manner in which the cushion sealing strips are placed on the front of the patch before vulcanization thereof.

Fig. 5 is a somewhat diagrammatic sectional view showing a tire patch in a vulcanizing equipment.

Fig. 6 is a fragmentary section on a plane represented by the line 6—6 of Fig. 4.

Fig. 7 is a back view of an alternative form of the invention, showing the manner in which the principles involved may be varied in the practice of my invention.

In Figs. 1 and 2 I show a portion of a tire casing 11 having the beads 12 thereof spread apart. This tire casing 11 is shown with a rupture or hole 13 therein and with the casing wall structure 14 trimmed down around the weak point, rupture, or hole. Against the inner face 15 of the wall structure 14 and in centralized position relative to the hole 13, a casing patch or reinforcing means 16 is placed, this casing patch 16 being of greatest thickness and strength at its center and tapering toward its edges so that the reinforcement of the casing provided by the patch 16 will be greatest at the weakest point of the casing, namely, the hole 13.

As shown in Fig. 3, the patch 16 consists of consecutively placed, reinforced sheet rubber layers or plies 21, 22, 23, and 24, these reinforced sheet rubber plies each preferably being cut from cord rubber tire fabric. The plies are consecutively and progressively decreased in size from bottom to top as illustrated and are respectively each formed with a central area or portion 25, 26, 27, and 28, from which central portions diametral tabs or tongues 31, 32, 33, and 34 respectively extend. The plies 21 to 24 are cut from the cord fabric sheet in such a manner that the direction of extension of the cord reinforcements coincides with the direction of the respective tabs. For instance, the cord reinforcement 35 of the member 21 extends parallel to the diametral center line on which the tabs 31 are positioned, and in a like manner the cord reinforcements 36, 37, and 38 of the consecutive plies 22, 23, and 24 extend parallel to the diametral center lines on which the respective tabs 32, 33, and 34 are located.

In the preferred form of the invention the central portions 25 to 28 of the plies 21 to 24 are equi-dimensional and form squares, each square central portion being slightly smaller than the preceding. The ply 22 is laid over the ply 21 in substantially centralized position and with the tabs 31 and 32, and likewise the cord reinforcements 35 and 36, extending at right angles. The tab 32 is of a width substantially equal to the width W of the tab 31 and projects farther from its central portion 26 than the tab 31 projects from its central portion 25 so that the extension of the tabs 32 beyond the edges 40 of the central portion 25 will be substantially equal to the outward extension L of the tabs 31. The plies 21 and 22 bear a primary and secondary relationship to each other in that although the central portion of the secondary member 22 is smaller than the central portion of the primary member 21, the tabs of the secondary member 22 are of the same width as, and greater in length than, the tabs of the primary member 21.

It will be noted that the reinforcement 35 and the reinforcement 37 of the members 21 and 23 extend parallel, and it will be further noted that the tabs 33 of the ply 23 extend beyond the edges of the central portion 26 of the ply 22 and adhere to the ply 21, thereby tying the members 21 and 23 together. In a similar manner, the tabs 34 extend over the edges of the central portion 27 of the member 23 and thereby tie the members 22 and 24 together so that forces applied to the tabs 32 in a direction corresponding to the reinforcement 36 will be transmitted by direct engagement to the member 24. From the foregoing it will be perceived that in my improved patch the second consecutive ply members are tied together by tabs which extend from the smaller of the two members.

After placing of the ply members 21 to 24 together in the manner above described, the assembly is turned over so that the member 21 will be presented upwardly with the tabs 32 of the member 22 projecting from the edges 40. A sealing or finish strip 41 of raw cushion rubber stock is then placed along the edges 40 in such position that the center line of the sealing or finish strip 41 approximately coincides with the edges 40, and the sealing strip 41 is carried in this relationship around the edges 42 of the member 21. Short pieces of sealing strip, as indicated at 41a, are placed around the projecting edges of the tabs 32 in position to overlap the edges. The assembly is then placed in a mold 43, as shown in Fig. 5, with a diagonal axis A—A* of Fig. 4 extending longitudinally. The diagonal axis is so named from the fact that it crosses the reinforcements 35 at an angle of 45°. The mold 43 has a rounded or substantially semi-cylindrical wall 44 supported in a hollow body 45 adapted to receive steam through piping 46. The patch 16 is placed in the mold with the front or ply 21 faced upwardly. A cylindrical sand bag 47 is then placed as shown in Fig. 5, and the ram 48 of a curing press is employed to press the sand bag tightly against the patch 16 whereby to compress the component parts thereof tightly together during the curing operation which is conducted until vulcanization is approximately three-quarters complete. During the vulcanization of the patch, the sealing or finish strips 41 and 41a are flattened out in the manner shown in Fig. 6, and the pressure exerted by the sand bag 47 causes some flowing of the rubber in the plies 21 to 24. The edges 40 and 42 are caused to taper off in the manner shown, and the sealing portions 41 and 41a completely cross the exposed edges so as to prevent bloom of these edges and to flexibly tie the edges 40 to the tabs 32 so that in flexing of the patch member the bending or flexure will not be concentrated at the edges, and thereby cracking or breaking of the patch is avoided. When the curing step is completed, the front and rear faces of the patch are substantially smooth, and the outer surfaces of the sealing strips 41 and 41a are continuous with the front surfaces of the ply 21 and the tabs 32. After completion of the curing operation, the back of the patch member is buffed, and a layer of cushion rubber 50 is placed thereon so as to become part of the patch, and this layer of cushion rubber 50 is covered by a sheet of holland fabric 51 which is stripped off when it is desired to place the patch on a tire casing.

As shown in Fig. 1, the patch 16 in its finished form is cemented to the casing 11, and preferably to the interior thereof, with the axis A—A coinciding with the circular extension of the tire casing so that the cord reinforcement which extends within the patch 16, as indicated by the lines b—b and c—c, will lie at angles of 45° relative to the circular extension of the casing 11, or at angles of 45° to the axis A—A, thus matching the direction of extension of the cord reinforcement of the patch 16 with the reinforcing cords of the casing 11. As further shown in Fig. 1, the peripheral corners of the patch 16 are rounded, and the corners 52, 53, and 54 lie substantially on transverse lines e—e which intersect the axis A—A at angles of 90°. Therefore, as the line of flexure of the tire during its rolling along the road surface approaches and traverses the patch, this line of flexure will first encounter the corners 52, 53, and 54, then the corners 56, 57, and 58, and finally the corners 60, 61, and 62, so that as the line of flexure travels from the edge of the patch toward the center thereof, the resistance of the patch to flexure will practically gradually increase from minimum to maximum without there being an abrupt increase in resistance to flexure at any point.

In Fig. 7 I show an alternative form of the invention in which a series of ply members 71, 72, 73, and 74 are placed in centralized position one upon the other, which ply members have substantially circular central portions 75 instead of polygonal central portions as shown in Fig. 3. Each of the ply members 71 to 74 has diametrally projecting tabs 76, and, in the manner characteristic of the tabs shown in Fig. 3, the tabs of the consecutive plies 72, 73, and 74 serve to tie the second consecutive ply members together along the lines of the cord reinforcements therein. It is characteristic of the invention to include in a reinforced patch member of this character three ply members, such as 71, 72, and 73, or 72, 73, and 74, which ply members are of greater length than width, and the first and third of which are placed at right angles to the second, the third ply member being smaller and shorter than the first and the ends thereof being vulcanized to the first whereby to tie the first and third together. It is a feature of the invention that this relationship exists between any group of three ply members which may be selected, it being recognized that the patch may be composed of any number of layers or plies placed together in the relationship hereinbefore described. In the practice of the invention I make casing patches of from four to twelve plies, depending upon the size of the tire and the character of the repair to be made.

I claim as my invention:

1. A casing patch of the character described, including: a plurality of ply members placed consecutively one upon the other, each consecutive ply member being smaller than the preceding ply member and certain of said ply members having diametrally opposed tabs extending therefrom and engaging an alternate ply member.

2. A casing patch of the character described, including: a plurality of cord-reinforced ply members placed consecutively one upon the other, each consecutive ply member being smaller than the preceding ply member and certain of said ply members having diametrally opposed tabs extending therefrom in the direction of the cord thereof and engaging an alternate ply member.

3. A casing patch of the character described, including: a plurality of ply members placed consecutively one upon the other, each ply member having a central portion of which the transverse dimensions are substantially the same, and each consecutive ply member being smaller than the preceding ply member and certain of said ply members having diametrally opposed tabs extending therefrom and engaging an alternate ply member.

4. A casing patch of the character described, including: a plurality of cord-reinforced ply members placed consecutively one upon the other, each ply member having a central portion of which the transverse dimensions are substantially the same, and each consecutive ply member being smaller than the preceding ply member and certain of said ply members having diametrally opposed tabs extending therefrom in the direction of the cord thereof and engaging an alternate ply member.

5. A casing patch of the character described, including: a plurality of ply members placed consecutively one upon the other, each consecutive ply member being smaller than the preceding ply member and comprising a central portion with a pair of tabs extending diametrally therefrom, the tabs of the odd consecutive ply members all extending in one direction and the tabs of the even consecutive ply members all extending at right angles to the tabs of said odd consecutive ply members, and said odd consecutive ply members being tied together by the tabs thereof and said even consecutive ply members being tied together by the tabs thereof.

6. A tire patch as defined in claim 5, in which said ply members are reinforced by cords extending in the direction of the respective tabs thereof.

7. A casing patch of the character described, including: a plurality of ply members placed consecutively one upon the other, said ply members being of greater length than width and being consecutively reduced in size, the odd consecutive ply members lying in one direction and the even consecutive ply members lying in a direction at 90° to said odd consecutive ply members.

8. A casing patch as defined in claim 7, in which the ends of the succeeding odd and even consecutive ply members engage the preceding of the odd and even consecutive ply members in a manner to tie said odd and said even consecutive ply members respectively together.

9. A casing patch as defined in claim 7, in which the ends of the succeeding odd and even consecutive ply members engage the preceding of the odd and even consecutive ply members in a manner to tie said odd and said even consecutive ply members respectively together, and in which patch said ply members have longitudinally extending cord reinforcements therein.

10. A preformed casing patch of the character described ready for insertion in a casing, including: a pair of reinforced ply members of greater length than width placed together in crossing relationship; and a sealing strip of rubber material placed on one side of the patch structure formed by said crossing ply members and vulcanized under heat and pressure in position to seal the exposed edges of said ply members.

11. A preformed casing patch of the character described ready to be placed in a casing, including: a plurality of cord-reinforced ply members placed consecutively one upon the other, each ply member having a central portion of which the transverse dimensions are substantially the same, and each consecutive ply member being smaller than the preceding ply member and having diametrally opposed tabs extending therefrom in the direction of the cord thereof; and a sealing strip of rubber material placed on one side of the casing patch formed by said ply members, and vulcanized under heat and into position to seal the exposed edges of said ply members.

12. A preformed casing patch of the character described ready to be placed in a casing, including: a plurality of ply members placed consecutively one upon the other, each ply member having a central portion of square shape, and each consecutive ply member being smaller than the preceding ply member and having a pair of diametrally extending tabs, there being longitudinal reinforcing cords extending within said ply members in the direction of the respective tabs thereof; and a sealing strip placed on one side of the casing patch formed by said ply members, and vulcanized under heat and into a position to seal the exposed edges of said ply members.

13. A preformed casing patch of the character described ready to be placed in a casing, including: a plurality of ply members placed consecutively one upon the other, each ply member having a central portion of square shape, and each consecutive ply member being smaller than the preceding ply member and having a pair of diametrally extending tabs, there being longitudinal reinforcing cords extending within said ply members in the direction of the respective tabs thereof; a sealing strip placed on one side of the casing patch formed by said ply members, and vulcanized under heat and into a position to seal the exposed edges of said ply members; and a layer of cushion rubber on the back of said casing patch.

14. A casing patch of the character described, including: a plurality of ply members placed consecutively one upon the other, each of said ply members being smaller in size than the preceding ply member, and one of said ply members having a tab extending therefrom adapted to engage an alternate ply member.

15. In a prevulcanized casing patch of the character described adapted to be subsequently placed in a tire casing so as to become an integral part thereof, the combination of: a patch structure made up of ply material and providing an edge in which reinforcing is exposed; and a sealing strip placed along said edge and having a portion formed to extend across said edge and cover the ends of reinforcing exposed therein, the top and bottom faces of said sealing strip merging with the top and bottom faces of said patch structure so that the formation of a ridge or shoulder is avoided.

16. In a prevulcanized casing patch of the character described adapted to be subsequently placed in a tire casing so as to become an integral part thereof, the combination of: a patch structure made up of ply material and providing an edge in which reinforcing is exposed; and a sealing strip placed along said edge and having a portion which extends from said edge, said sealing strip being vulcanized to said patch structure under such pressural conditions that said extended portion of said sealing strip tapers to a relatively thin feather edge and is formed to extend across said edge and to cover the ends of the reinforcing exposed therein.

17. A casing patch of the character described, including: a first ply member; a second ply member placed on said first ply member in crossing relationship; and a third ply member placed on said second ply member in alignment with said first ply member, said third ply member comprising a central area and a tab portion extending from said central area beyond an edge of said second ply member and engaging said first ply member.

18. A preformed casing patch of the character described adapted to be subsequently placed in a tire casing so as to become an integral part thereof, including: a patch structure comprising ply members secured together in crossing relation and providing an edge; a sealing strip of rubber material placed on one side of said patch structure and along the edge thereof, said sealing strip overlapping said edge and being deformed laterally to extend across said edge and being vulcanized to said edge; and a layer of cushion rubber placed on the other side of said patch structure to cover the same.

19. A prevulcanized casing patch of the character described adapted to be subsequently placed in a tire casing so as to become an integral part thereof, comprising: a patch structure comprising a ply member having an exposed edge; and a sealing layer of rubber material on the patch structure in a position to overlap said edge, said overlapping portion being deformed laterally to extend across said edge and having vulcanized engagement with said edge so as to seal the same.

20. A preformed casing patch of the character described ready for placing in a casing, including: a plurality of ply members placed together and providing an edge; and a sealing strip of rubber material extending along said edge, said strip being formed under heat and pressure so as to extend across and cover said edge.

21. A preformed casing patch of the character described ready for placing in a casing, including: a plurality of ply members placed together and providing an edge; and a sealing layer of rubber material placed so that a portion thereof will extend along said edge, said patch being formed under lateral pressure so as to feather the edge portion of the patch and to deform said strip across said edge so that said edge will be covered thereby.

22. A preformed casing patch of the character described ready for placing in a casing, including: a patch structure made up of a plurality of layers of ply material adhering in face-to-face placement, said patch structure being preformed by application of lateral pressure thereto so that the edge portions of the patch structure taper off to feather edges and so that the faces of said patch structure extend from edge to edge of the patch structure substantially without the formation of a shoulder between the edges of the patch structure.

23. A preformed casing patch of the character described ready for placing in a casing, including: a patch structure made up of a plurality of layers of ply material adhering in face-to-face placement, said patch structure being preformed and vulcanized by the application of heat and lateral pressure thereto so that the edge portions of the patch structure taper off to feather edges and so that the faces of said patch structure extend from edge to edge of the patch structure substantially without the formation of a shoulder between the edges of the patch structure.

24. A preformed casing patch of the character described ready for placing in a casing, including: a plurality of ply members molded together in superimposed relation so as to be relatively thick in its intermediate portion and to thin out toward an edge of the patch, the front and back faces of said patch being substantially smooth from edge to edge of the patch and meeting at a relatively thin feather edge.

25. A preformed casing patch of the character described ready for placing in a casing, including: a plurality of ply members molded together in superimposed relation so as to thin out toward an edge of the patch, the front and back faces of said patch being substantially smooth from edge to edge of the patch and meeting at a relatively thin feather edge, said patch being at least partly vulcanized.

26. A preformed casing patch of the character described ready for placing in a casing, including: a plurality of ply members molded together in superimposed relation so as to thin out toward an edge of the patch, the front and back faces of said patch being substantially smooth from edge to edge of the patch and meeting at a relatively thin feather edge, said patch having a thin peripheral edge of flexible rubber which seals the ends of the reinforcing in the edge portion of the patch, the top and bottom faces of said peripheral edge of flexible rubber merging smoothly with the faces of the patch.

27. A preformed molded inside casing patch of the character described, including: a plurality of ply members of different sizes molded together in superimposed relation so as to form a body portion with tabs extending outwardly therefrom, said patch having substantially smooth outer faces extending completely to the edges thereof and being curved so as to be readily fitted to the inner wall of the casing.

28. A preformed and premolded inside casing patch of the character described adapted to be subsequently placed in a tire casing so as to become an integral part thereof, including: a plurality of ply members prevulcanized and molded together in crossing superimposed relation so as to form a body portion with tabs extending outwardly therefrom and a molded smooth outer face extending to the peripheral edges of the patch.

29. A preformed and premolded inside casing patch of the character described adapted to be subsequently placed in a tire casing so as to become an integral part thereof, including: a plurality of ply members prevulcanized and molded together in crossing superimposed relation so as to form a body portion with tabs extending outwardly therefrom and a molded smooth outer face extending to the peripheral edges of the patch; and a layer of vulcanizable rubber on the face of said patch which is to be applied to the casing.

30. A preformed molded casing patch of the character described adapted to be subsequently placed in a tire casing so as to become an integral part thereof, including: a patch structure consisting of a plurality of ply members of different sizes molded and vulcanized together in superimposed relation so that said patch structure has a relatively thick central portion and becomes thinner toward specified edges thereof, said patch structure being molded with its faces substantially continuously smooth from edge to edge of the patch structure; and a layer of vulcanizable gum rubber on the face of said patch structure which is to be applied to the casing.

31. A preformed molded casing patch of the character described adapted to be subsequently placed in a tire casing so as to become an integral part thereof, including: a patch structure consisting of a plurality of ply members of different sizes molded and vulcanized together in superimposed relation so that said patch structure has a relatively thick central portion and becomes thinner toward specified edges thereof, said patch structure being molded with its faces substantially continuously smooth from edge to edge of the patch structure and with a vulcanized feathered strip of non-reinforced rubber forming said specified edges.

32. A casing patch of the character described adapted to be placed within a casing and to be made a part thereof, including: a pair of ply members of greater length than width placed in crossing relation, the edge portion of one of said ply members lying on the surface of the other of said ply members; and a relatively narrow sealing strip of rubber placed so as to cover said edge portion which overlies said surface of the other of said ply members.

33. A method of the character described for forming a casing patch prior to the placing of said patch in a tire casing, comprising: placing ply members together in superimposed relation to produce a patch body, some of said ply members being of reduced size so that the patch body will be of greater thickness at an intermediate portion thereof, some of said ply members comprising rubber; and applying lateral pressure to the front and back faces of said patch body to taper said patch body substantially gradually toward an edge thereof and to flatten out in at least one of said faces of said patch body the shoulders caused by edges of ply members embodied in the patch body.

34. A method of the character described for forming a casing patch prior to the placing of said patch in a tire casing, comprising: placing ply members together in superimposed relation to produce a patch body, some of said ply members being of reduced size so that the patch body will be of greater thickness at an intermediate portion thereof, some of said ply members comprising rubber; and pressing said patch body against a plate in such a manner and with sufficient pressure to taper said patch body toward an edge thereof and to flatten shoulders intermediate the edges of said patch body.

35. A method of the character described for forming a casing patch prior to the placing of said patch in a tire casing, comprising: placing ply members together in superimposed relation to produce a patch body, some of said ply members being of reduced size so that the patch body will be of greater thickness at an intermediate portion thereof, some of said ply members comprising rubber; and pressing said patch body against a plate in such a manner and with sufficient pressure to taper said patch body toward a peripheral edge portion thereof and form at said peripheral edge portion a definite feather edge capable of flexing freely with a casing wall to which the patch may be secured.

36. A method of the character described for forming a casing patch prior to the placing of said patch in a tire casing, comprising; placing ply members together in superimposed relation to produce a patch body, some of said ply members being of reduced size so that the patch body will be of greater thickness at an intermediate portion thereof, some of said ply members comprising rubber; and applying heat and lateral pressure to the front and back faces of said patch body to taper said patch body toward an edge thereof and to flatten out in at least one of said faces of said patch body the shoulders caused by edges of ply members embodied in the patch body.

37. A method of the character described for forming a casing patch prior to the placing of said patch in a tire casing, comprising: placing ply members together in superimposed relation to produce a patch body, some of said ply members being of reduced size so that the patch body will be of greater thickness at an intermediate portion thereof, some of said ply members comprising rubber; pressing said patch body against a plate in such a manner and with sufficient pressure to taper said patch body toward an edge thereof and to flatten shoulders intermediate the edges of said patch body; and applying heat to said patch body to produce a vulcanization of the same.

38. A preformed molded casing patch of the character described adapted to be subsequently placed in a tire casing so as to become an integral part thereof, including: a plurality of ply members placed consecutively, one on the other, said ply members being of greater length than width, and certain of said ply members being smaller than the others, the odd consecutive ply members lying in one direction, the even consecutive ply members lying in a direction substantially at right angles to said odd consecutive ply members, the ends of the succeeding odd and even ply members engaging the preceding odd and even consecutive ply members in a manner to tie said odd and even consecutive ply members together, and said ply members being molded to form a patch structure with its faces substantially continuously smooth from edge to edge thereof.

JOHN T. SPRINGER.